United States Patent
Abadpour et al.

(10) Patent No.: US 10,209,403 B2
(45) Date of Patent: Feb. 19, 2019

(54) METHOD OF MODELLING A SUBSURFACE VOLUME

(71) Applicant: Total S.A., Paris (FR)

(72) Inventors: Anahita Abadpour, Pau (FR); Pierre Bergey, Saint-Germain-en-Laye (FR)

(73) Assignee: Total S.A., Courbevoie (FR)

( * ) Notice: Subject to any disclaimer, the term of this patent is extended or adjusted under 35 U.S.C. 154(b) by 522 days.

(21) Appl. No.: 14/767,450

(22) PCT Filed: Feb. 7, 2014

(86) PCT No.: PCT/EP2014/052495
§ 371 (c)(1),
(2) Date: Aug. 12, 2015

(87) PCT Pub. No.: WO2014/124884
PCT Pub. Date: Aug. 21, 2014

(65) Prior Publication Data
US 2015/0378053 A1    Dec. 31, 2015

(30) Foreign Application Priority Data
Feb. 15, 2013  (GB) .................................. 1302707.3

(51) Int. Cl.
*G01V 99/00* (2009.01)
(52) U.S. Cl.
CPC ........ *G01V 99/005* (2013.01); *G01V 2210/61* (2013.01); *G01V 2210/66* (2013.01); *G01V 2210/663* (2013.01); *G01V 2210/665* (2013.01)
(58) Field of Classification Search
CPC ........... G01V 99/005; G01V 2210/663; G01V 2210/61; G01V 2210/66; G01V 2210/665
(Continued)

(56) References Cited

U.S. PATENT DOCUMENTS

| | | | |
|---|---|---|---|
| 2008/0077371 A1* | 3/2008 | Yeten | E21B 43/00 703/10 |
| 2010/0057413 A1 | 3/2010 | Lee et al. | |

(Continued)

FOREIGN PATENT DOCUMENTS

| | | |
|---|---|---|
| EP | 2447467 A1 | 5/2012 |
| WO | WO-2008/028122 A2 | 3/2008 |
| WO | WO-2014124884 A1 | 8/2014 |

OTHER PUBLICATIONS

Jouini, Mohamed Soufiane, et al.; "Simulation of Elastic Properties in Carbonates"; The Leading Edge; Dec. 2011; pp. 1400-1407.
(Continued)

*Primary Examiner* — Fernando L Toledo
*Assistant Examiner* — Adam S Bowen
(74) *Attorney, Agent, or Firm* — Winstead PC

(57) ABSTRACT

Disclosed is a method of monitoring the behavior of a subsurface volume. The method comprises transforming a single discrete parameter or an ensemble of discrete parameters describing an attribute of the subsurface volume, each discrete parameter having N possible discrete values with N≥2, into N indicator parameters each having 2 possible discrete values; for each of the two value classes of each indicator parameter, determining the anisotropic distance to a value transition interface; transforming each of the indicator parameters into a corresponding continuous parameter using the determined anisotropic distance to the value transition interface; and using the continuous parameters in a history matching process.

26 Claims, 2 Drawing Sheets

(58) Field of Classification Search
USPC .......................................................... 702/2
See application file for complete search history.

(56) References Cited

U.S. PATENT DOCUMENTS

| | | | | |
|---|---|---|---|---|
| 2010/0185422 | A1* | 7/2010 | Hoversten | G01V 11/00 703/2 |
| 2010/0254217 | A1 | 10/2010 | Chu et al. | |
| 2011/0131015 | A1* | 6/2011 | Yarus | G01V 99/005 703/1 |
| 2011/0137565 | A1* | 6/2011 | Perlmutter | G01V 11/00 702/6 |
| 2011/0194379 | A1* | 8/2011 | Lee | G01V 1/368 367/73 |
| 2011/0205844 | A1 | 8/2011 | Maucec et al. | |
| 2011/0273959 | A1* | 11/2011 | Jin | G01V 1/30 367/38 |
| 2011/0276320 | A1* | 11/2011 | Krebs | G01V 11/00 703/6 |
| 2011/0295510 | A1 | 12/2011 | Gulati | |
| 2012/0014218 | A1 | 1/2012 | Houck et al. | |
| 2012/0084043 | A1* | 4/2012 | Courtade | G06F 17/5009 702/123 |
| 2012/0109597 | A1* | 5/2012 | Derfoul | E21B 43/00 703/2 |
| 2012/0143506 | A1* | 6/2012 | Routh | G01V 1/282 702/2 |
| 2013/0028052 | A1* | 1/2013 | Routh | G01V 1/28 367/43 |
| 2013/0250726 | A1 | 9/2013 | Frydman et al. | |

OTHER PUBLICATIONS

Vollmer, Thorsten, "International Search Report" for PCT/EP2014/052495, dated Jul. 25, 2014, 3 pages.
U.S. Appl. No. 14/767,492, Bergey et al.
Abadpour, Anahita, et al., "4D Seismic History Matching with Ensemble Kalman Filter—Assimilation on Hausdorff Distance to Saturation Front," SPE Reservoir Simulation Symposium, Feb. 18, 2013, pp. 1-8.
Trani, M., et al., "Seismic History Matching of Fluid Fronts Using the Ensemble Kalman Filter," SPE Journal, Feb. 1, 2013, pp. 159-171.

* cited by examiner

METHOD OF MODELLING A SUBSURFACE VOLUME

The present disclosure relates to methods of subsurface modelling and in particular to such methods for modelling the behaviour of a subsurface hydrocarbon reservoir using history matching techniques.

Subsurface Models

Subsurface models may comprise, for example, reservoir flow, basin, and geo-mechanical models. These comprise gridded 3D representations of the subsurface used as inputs to a simulator allowing the prediction of a range of physical properties as a function of controlled or un-controlled boundary conditions:

Reservoir flow models aim to predict fluid flow properties, primarily multi-phase rates (and composition), pressure and temperature, under oil and gas field or aquifer development scenarios.

Basin models aim to predict over time the types of hydrocarbon being generated out of kerogen, and the location of hydrocarbon trapping at geological timescales.

Geo-mechanical models aim to predict stress and stress related phenomenon such as heave/subsidence or failure in natural conditions or under oil and gas or aquifer development conditions.

Subsurface models are often generated using geo-statistical methods. Such models often include high level discrete parameters which are variables that condition/control a number of lower order continuous parameters/variables. Discrete high level variables are typically used in subsurface modelling to capture geological heterogeneities of critical importance to the overall process. Discrete geological 3D parameters (e.g. facies, architectural elements) often display complex 3D relationships.

Such discrete parameters may be sortable or non-sortable. A high-level non sortable discrete parameter is such that:

It conditions/controls at least two other parameters; and

The values of the controlled parameters cannot necessarily be statistically ranked in a particular order.

A discrete sortable high level parameter is such that values of lower level parameters conditioned to the high level parameter can always be statistically sorted in the same order. An indicator is a discrete parameter which takes one of two possible values (i.e. it is binary in nature), typically represented by numerical values 0 and 1. An indicator is intrinsically sortable.

Facies is a typical example of a non-sortable parameter. To illustrate the concept, consider an example in which the facies parameter may take the following values: Channels, Stacked lobes, Shale floodplain; and where the facies parameter governs the following controlled parameters: Porosity, Horizontal Permeability and Vertical to Horizontal Permeability Ratio. It can be shown that the three controlled parameters are statistically ranked in the following manner:

Horizontal permeability: Stacked lobes>Channels>Shale floodplain

Vertical to horizontal permeability ratio: Channels>Shale floodplain>Stacked lobes Porosity: Channels>Stacked lobes>Shale floodplain For a non-sortable, high-level discrete parameter, an intermediate value between two discrete values has no clear meaning as the related conditional properties are sorted in differing orders.

Assisted History Match (AHM) processes, suitable for handling continuous parameters, often result in "intermediate" or average expected values when used directly for discrete parameters. This makes them totally unsuitable to the inversion of high-level, discrete non-sortable parameters (among which is geological facies, a prominent feature of most subsurface models). It also creates inefficiencies in handling discrete sortable parameters which display complex spatial correlations when using such AHM processes.

Assisted History Match processes suitable for handling discrete parameters often destroy spatial relationships of such parameters.

There are a number of ways that high level parameters are dealt with in AHM processes at present. These include Ignoring the high level parameter and handling only the conditional parameters.

Treating non sortable high-level discrete parameters as sortable high level discrete parameters. This is done by sorting values of the discrete non-sortable parameter as best as possible considering the relative importance of the conditional parameters and treating the discrete parameter as sortable.

Treating sortable high level discrete parameters as continuous parameters. The conversion from continuous to discrete parameter is operated by rounding or truncating.

Using the Gaussian field(s) which were used to generate the 3D realizations of the discrete property being considered.

Considering, during the AHM process, higher level parameters than the discrete parameter being considered. For example, handling the facies proportion cube as an uncertain parameter instead of discrete 3D facies realizations generated using the facies proportion cube.

It would be desirable to be able to better handle such discrete parameters, and particularly non-sortable discrete parameters in Assisted History Match processes.

SUMMARY OF INVENTION

In a first aspect of the invention there is provided a method of monitoring the behaviour of a subsurface volume, said method comprising: transforming a single discrete parameter or an ensemble of discrete parameters describing an attribute of said subsurface volume, each discrete parameter having N possible discrete values with $N \geq 2$, into N indicator parameters each having 2 possible discrete values; for each of the two value classes of each indicator parameter, determining the anisotropic distance to a value transition interface; transforming each of said indicator parameters into a corresponding continuous parameter using said determined anisotropic distance to the value transition interface; and using said continuous parameters in a history matching process.

Other aspects of the invention comprise a computer program comprising computer readable instructions which, when run on suitable computer apparatus, cause the computer apparatus to perform the method of the first aspect; and an apparatus specifically adapted to carry out all the steps of any of the method of the first aspect.

Other non-essential features of the invention are as claimed in the appended dependent claims.

BRIEF DESCRIPTION OF THE DRAWINGS

Embodiments of the invention will now be described, by way of example only, by reference to the accompanying drawings, in which.

DETAILED DESCRIPTION OF THE EMBODIMENTS

Figure 1:
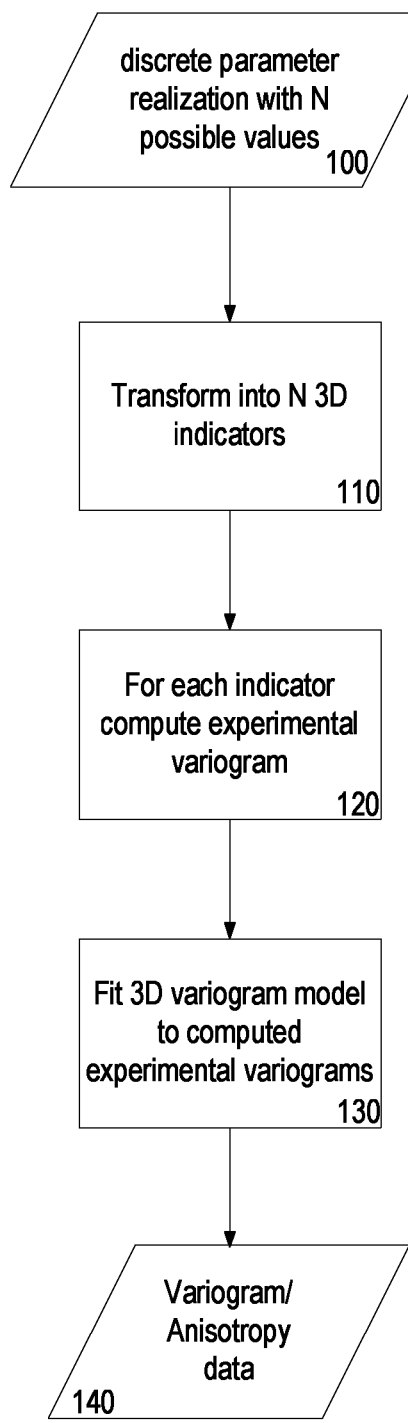
FIG. 1 is a flowchart illustrating an embodiment of a variogram determination process which may form part of an embodiment of the invention.

History matching is an inversion process wherein initial input data (a realization) is modified so that the simulated (or predicted) dynamic responses are a better match with the measured ones. It comprises determining the input data, considering a given forward modelling process and set of constraints, which results in a simulation output that best corresponds to observed data (over the same timeframe) similar in nature to the simulation output. In this way input assumptions can be improved when modelling future behaviour.

Assisted History Match (AHM) is any method automating such process. Assisted History Match methods usually rely upon an iterative process of minimization of a cost (objective) function.

In the context of AHM, parameterisation methods are methods in which part of the input data or the observations are transformed in such a way that the iterative optimization process is made more efficient (for example requiring fewer iterations to solve, resulting in better fit to observation and/or less modification to the input data). A parameterisation method, in an iterative inversion scheme, may comprise a set of two functions to transform data back and forth between the simulation input parameter space and the iterative optimization parameter space.

The AHM of subsurface models presents particular challenges (when compared with other inversion problem) in relation with the high cost of forward simulation, the non-linearity of the relation between simulation input and output, the complexity of the input data, the large amount of a priori data comprised in the input data and the limited number of observations usually available.

High dimensional AHM methods refer to methods allowing the simultaneous optimization of a large number of input parameters. They include Ensemble methods such as Particle-filters, Ensemble Kalman filter (EnKF) and Ensemble Smoother (ES). In such methods an ensemble of model realizations is used to provide the relationship between the observation being inverted for and the uncertain parameters being optimized. In a class of these methods (including EnKF and ES) a Kalman filter is applied to update the uncertain parameters while assimilation is done sequentially (EnKF) or in one go (ES) over the measurements. These methods are particularly sensitive to the Gaussian character of the input data, and to how close to linearity the relationship is between input parameters and observations. They accept only continuous parameters as input.

Ensemble Kalman Filter techniques involve starting with an ensemble of initial realizations. Each realization may describe one or more parameters (such as facies, permeability, porosity etc.) over a volume of a reservoir, which may be divided into cells. Initially, the parameters of only a small number of cells will be known with any degree of certainty (those which have been actually measured) and assumed values are used for the parameters in remainder of the cells. Prior to the first iteration, these assumed values may be random or semi-random seed values.

A simulation output is computed for each of these realizations, for a given time interval. The covariance between observation and input parameters in the Kalman filter is then computed. The resultant correlation data is combined with the mismatch in the observed data measured after the same time interval, to produce an ensemble of updated realizations which should be in greater conformity with the measured data. These updated realizations would then be used as the input of a further simulation.

Other methods such as Evolution strategies and Genetic algorithms allow handling discrete parameters. Their efficiency is generally enhanced when applied to normal distributions.

Disclosed herein is a distance-to-interface AHM approach which, in an embodiment, may use an Ensemble Kalman Filter. In this approach it is proposed to normalise the distance to interface calculation using a variogram, and in particular the variogram anisotropy and curvature.

A variogram is, in a mono or multi-dimensional space, a statistical measure of average dissimilarity between data as a function of their separation in space. It describes the relationship between the variance of the difference between field values at couples of locations across field realizations as a function of the distance (lag) between these locations. A directional variogram is a variogram computed over couples of locations aligned along the same direction.

An experimental variogram is a variogram computed from spatial realization(s) of field values. A variogram model is an analytical function controlled by a limited number of parameters linking lag to property variance. Variogram fitting relates to the operation of minimizing the differences between a variogram model and an experimental variogram. A variogram anisotropy across two pre-defined directions may be derived from fitting the same variogram model in both directions except for a (variogram) scaling ratio.

The proposed methodology comprises two main processes. The first of these processes is a variogram determination process and the second process is the normalised distance-to parameterisation process.

The variogram determination is to be performed at least once. In an embodiment a single initial determination is sufficient and this process is only performed once. In other embodiments the process may be performed more than one; for example it may be repeated throughout the iterative AHM process. The normalised distance-to parameterisation process is a two way transform process operated in each direction at each iterative AHM step.

FIG. 1 is a flowchart illustrating an embodiment of the variogram determination process. The method comprises the determination of a variogram and of variogram anisotropy for each value class of the discrete parameter being treated. Such variogram and anisotropy may be an experimental indicator variogram or a fitted variogram model. It may be derived from the parameter being transformed or from an external input. Other variability measures (e.g. a correlogram) may be used as an alternative to a variogram.

Referring to the specific example of FIG. 1, one or an ensemble of 3D discrete parameter(s) each having N possible discrete values (step 100), are transformed at step 110 into N 3D indicators (binary parameters). For each indicator, at step 120, an experimental variogram is computed along three pre-defined orthogonal geometric or grid directions. At step 120, a 3D variogram model, combining a unique variogram and two anisotropy factors (e.g. anisotropy in two directions compared to a third direction—possibly anisotropy in y and z directions compared to the x direction), is fitted to the experimental variogram of each indicator. In general a different 3D variogram model is fitted to each variogram such that a model is obtained for each indicator, although it is possible to use similar variograms for different indicators also. The result is variogram and anisotropy data (Step 130) which can be used to normalise the distance-to-interface values in the process described in relation to FIG. 2 below.

The 3D variogram model is typically Gaussian (normal) as using a Gaussian variogram model helps ensure that the transformed variable has a Gaussian character which will increase the rate of convergence during the AHM process.

Figure 2:
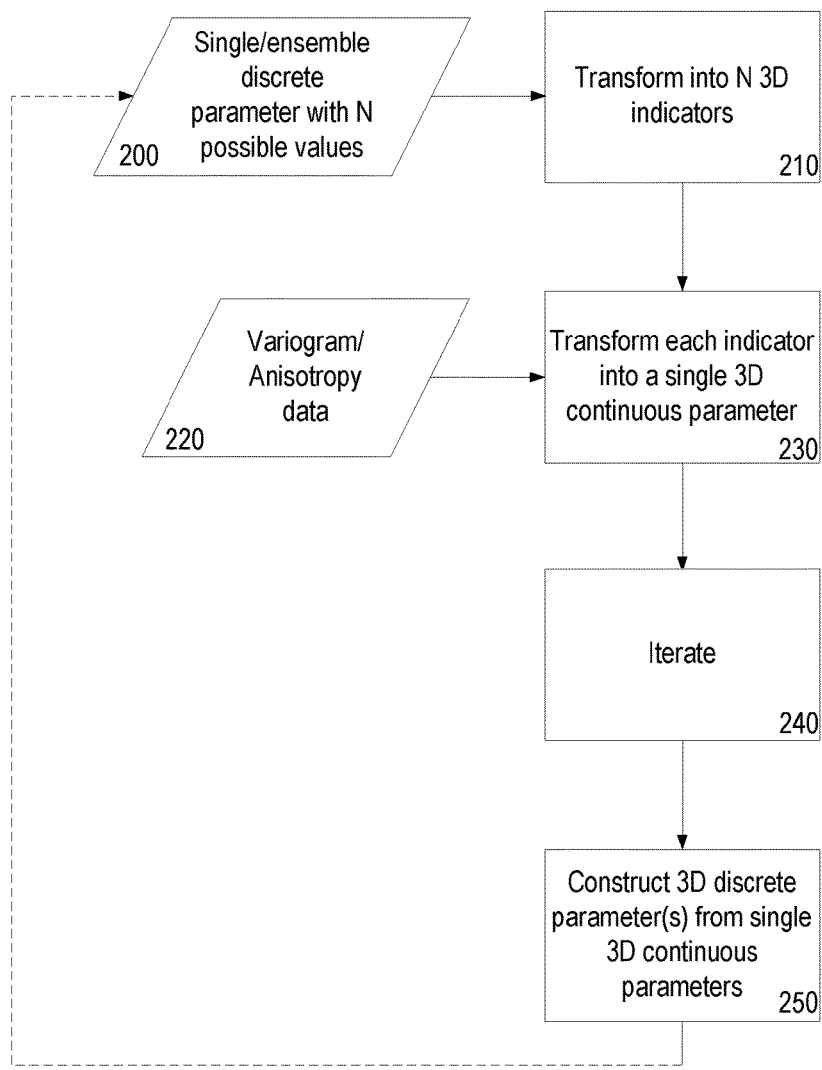
FIG. 2 is a flowchart illustrating a normalised distance-to parameterisation process according to an embodiment of the invention.

FIG. 2 is a flowchart illustrating an embodiment of the normalised distance-to parameterisation process. The process is performed using two transformation functions (a forward transform and a reverse transform). The forward transform transforms 3D discrete data into sets of continuous 3D data. The reverse transform operates a reciprocal transformation of sets of 3D continuous data into 3D discrete data. The two-way transformation process may be performed at every iteration of the AHM process, or for only a subset of iterations (for example to save processing effort).

Referring to the workflow of FIG. 2, a single or ensemble of 3D discrete parameter realizations (step 200), each having N possible discrete values, are transformed at step 210 into N 3D indicators (binary parameters).

At step 230 each of the discrete parameters is transformed into a 3D continuous parameter (forward transformation). This is done by computing the anisotropic distance to the value transition (0/1) interface within each class of cells constituting the indicator. A different sign is assigned to the distance in each class. Such a transformation can be performed by use of an anisotropic fast marching method or an isotropic fast marching method on a support of information, stretched appropriately according to the anisotropy, along the variogram directions.

The anisotropy data (and possibly other data from the variogram) 220 used at step 230 in calculating the anisotropic distance to the value transition interface may be the anisotropy (and variogram) data 130 calculated using the method illustrated by FIG. 1. This data can originate from the data constraining the model ensemble rather than the model itself: for example, data relating to distance to the boundary of a (water) saturated volume, originated from seismic observations, may be used. In one embodiment, variogram/anisotropy can originate from the linear combination of the variograms fitted to experimental variograms for each indicator. Alternatively, variogram/anisotropy data 220 can be derived from expert knowledge of the problem. The variogram model can be continuously variable. It can be derived from the fitting of a model to a local experimental variogram or from the local data constraining the model.

In an embodiment, the anisotropy may be derived from the aspect ratio obtained by variogram analysis of the indicator parameter being processed.

In addition to computing the anisotropic distance to 0/1 interface using the calculated anisotropy data for the indicator being processed, the method may further include using the variogram for that indicator, and in particular the curvature of the variogram, to normalize the calculated distances according to the correlation length (i.e. the range over which fluctuations in one region of space are correlated with those in another region). Also, the forward transform may be derived from the curvature intrinsic in a physical law between a specific property and a distance. Such laws can be used to calculate the correlation length associated to each property. For example, a cubic root may be used to relate the volume of a sphere to its radius, a square root may be used to relate the surface of a disc to its radius.

At step 240, an AHM iteration is performed. This may (in an embodiment) be performed using an Ensemble Kalman Filter or similar. The output of this step will consist of N continuous parameters, each associated with a discrete value.

Following this, at step 250 a 3D discrete parameter is constructed. In one embodiment, this may be performed by finding, for each location of 3D space being considered, the continuous parameter having the maximum (or minimum) value at that location and attributing the corresponding discrete value to the location. Alternatively, this step may be performed by sequentially considering each discrete parameter class and defining whether or not a given cell belongs to the considered class based upon the sign of the distance to the corresponding value transition interface. This second example is sensitive to the sequencing of discrete classes which constitute an input into the process. Such a sequence can be equilibrated (all sequences used in equal proportions), randomized or reflect a priori knowledge of the problem.

Step 250 outputs an ensemble of discrete parameters (or single parameter) which should provide a simulation output that better corresponds to observed data/history. This output can be used as an input for a further iteration of the AHM process. The further iteration may use the same variogram/anisotropy data, or else updated data may be obtained by repeating the variogram determination process. In this way, the variogram and variogram anisotropy used in the process may be re-computed multiple times during the iterative history matching process.

The approach described above results in a normalization of the distance to interface by the local estimation variance of the related indicator variable. This ensures the 3D variability and local proportions are respected if they are certain or close to the observed reality, or else if they are not, they are modified as minimally as possible so they remain closer to the input proportions or variability of initial models. This ensures an efficient balance between respecting the variography and proportions of the discrete parameter being inverted and honouring the observations at the same time.

In the particular case in which the model being handled has been generated using Sequential Indicator Simulation and the observations are compatible with the parameters controlling the SIS process, the approach will ensure that the solution found is fully compatible with said controlling parameters.

The disclosed method is generic in the sense that it does not require prior knowledge of any Gaussian fields used to generate a specific ensemble of models nor to higher level variables controlling the model construction. The method allows the exploration of the solution space beyond the space defined by the method used to generate the initial ensemble. The approach ensures faster convergence and closer fit to the observations.

One or more steps of the methods and concepts described herein may be embodied in the form of computer readable instructions for running on suitable computer apparatus, or in the form of a computer system comprising at least a storage means for storing program instructions embodying the concepts described herein and a processing unit for performing the instructions. As is conventional, the storage means may comprise a computer memory (of any sort), and/or disk drive or similar. Such a computer system may also comprise a display unit and one or more input/output devices.

The concepts described herein find utility in all aspects of surveillance, monitoring, optimisation and prediction of hydrocarbon reservoir and well systems, and may aid in, and form part of, methods for extracting hydrocarbons from such hydrocarbon reservoir and well systems.

It should be appreciated that the above description is for illustration only and other embodiments and variations may be envisaged without departing from the spirit and scope of the invention. For example, while the method is described in terms of 3D models, it is applicable to 2D models.

The invention claimed is:

1. A method of modelling behaviour of a subsurface volume, said method comprising:
    transforming a single discrete parameter or an ensemble of discrete parameters describing an attribute of said subsurface volume, each discrete parameter having N possible discrete values with N≥2, into N indicator parameters each having 2 possible discrete values;
    for each of two value classes of each indicator parameter, determining an anisotropic distance to a value transition interface;
    transforming each of said indicator parameters into a corresponding continuous parameter using said determined anisotropic distance to the value transition interface;
    using said continuous parameters in a history matching process; and
    utilizing results of the history matching process for at least one of surveillance, monitoring, optimization, and prediction of hydrocarbon reservoir and well systems.

2. The method as claimed in claim 1 comprising, following the use of said continuous parameters in a history matching process, or iteration thereof, constructing a discrete parameter from said continuous parameters.

3. The method as claimed in claim 2 wherein said step of constructing a discrete parameter from said continuous parameters comprises: finding, for each location of said volume being considered, the continuous parameter having the maximum or minimum value at that location and attributing the corresponding discrete value to the location.

4. The method as claimed in claim 2 wherein said step of constructing a discrete parameter from said continuous parameters comprises: sequentially considering each discrete parameter value class and defining whether or not a given cell belongs to the considered class based upon a sign of a distance to a corresponding value transition interface.

5. The method as claimed in claim 1 wherein each of said parameters is a 3D parameter.

6. The method as claimed in claim 1 wherein said single discrete parameter or ensemble of discrete parameters are non-sortable.

7. The method as claimed in claim 1 wherein anisotropy data used to determine the anisotropic distance to a value transition interface is calculated using one or more variograms.

8. The method as claimed in claim 7 wherein the anisotropic data is derived from an aspect ratio obtained by variogram analysis of the corresponding indicator parameter.

9. The method as claimed in claim 7 wherein said determined anisotropic distances to a value transition interface are normalized according to a correlation length.

10. The method as claimed in claim 9 wherein said correlation length is calculated from a curvature of said one or more variograms.

11. The method as claimed in claim 1 comprising the steps of:
    calculating variance and anisotropy data for said single discrete parameter; and
    using said calculated variance and anisotropy data in said calculation of the anisotropic distance to value transition interface.

12. The method as claimed in claim 11 wherein the step of calculating variance and anisotropy data comprises:
    transforming said discrete parameter or an ensemble of discrete parameters describing an attribute of said subsurface volume, each discrete parameter having N possible discrete values with N≥2, into N indicator parameters each having 2 possible discrete values; and
    computing an experimental variogram for each of said indicator parameters.

13. The method as claimed in claim 12 wherein said experimental variograms are calculated along three predefined orthogonal geometric or grid directions.

14. The method as claimed in claim 13 further comprising the step of fitting a 3D variogram model, combining a variogram and two anisotropy factors, to the experimental variogram of each indicator.

15. The method as claimed in claim 13, wherein the method further comprises the steps of:
    obtaining a measure of a correlation length from said experimental variogram or variogram model; and
    normalising said determined anisotropic distances to a value transition interface according to the correlation length.

16. The method as claimed in claim 1 wherein a different sign is assigned to the anisotropic distance to value transition interface in each value class.

17. The method as claimed in claim 1 wherein said history matching process is iterative.

18. The method as claimed in claim 17 wherein said anisotropic distance to interface data is calculated for every iteration of said history matching process.

19. The method as claimed in claim 17 wherein said anisotropic distance to interface data is calculated only once, prior to the first iteration of said history matching process.

20. The method as claimed in claim 17, wherein the method steps transforming said single discrete parameter or an ensemble of discrete parameters into said continuous parameters is performed for every iteration of said history matching process.

21. The method as claimed in claim 17, wherein the method steps transforming said single discrete parameter or an ensemble of discrete parameters into said continuous parameters is performed for a subset of iterations comprised in said history matching process.

22. The method as claimed in claim 1 wherein said history matching process uses an ensemble Kalman filter technique.

23. The method as claimed in claim 1 further comprising the step of using the results of said history matching process to aid hydrocarbon recovery from a reservoir.

24. A computer program comprising computer readable instructions which, when run on suitable computer apparatus, cause the computer apparatus to perform the method of claim 1.

25. A computer program carrier comprising the computer program of claim 24.

26. Apparatus specifically adapted to carry out the steps of the method as claimed in claim 1.

* * * * *